(12) United States Patent
Shanbhogue et al.

(10) Patent No.: US 8,244,945 B2
(45) Date of Patent: Aug. 14, 2012

(54) EFFICIENT HANDLING OF INTERRUPTS IN A COMPUTING ENVIRONMENT

(75) Inventors: Vedvyas Shanbhogue, Portland, OR (US); Uday Savagaonkar, Beaverton, OR (US); Ravi Sahita, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1063 days.

(21) Appl. No.: 12/050,862

(22) Filed: Mar. 18, 2008

(65) Prior Publication Data

US 2009/0241189 A1 Sep. 24, 2009

(51) Int. Cl.
*G06F 13/24* (2006.01)
(52) U.S. Cl. .................. 710/261; 710/200; 710/240
(58) Field of Classification Search .......... 710/260–269, 710/240–244, 200; 713/152
See application file for complete search history.

(56) References Cited

U.S. PATENT DOCUMENTS

| | | | |
|---|---|---|---|
| 2006/0236094 A1* | 10/2006 | Leung et al. | 713/152 |
| 2007/0006175 A1 | 1/2007 | Durham et al. | |
| 2008/0235793 A1* | 9/2008 | Schunter et al. | 726/22 |

* cited by examiner

*Primary Examiner* — Brian Misiura
*Assistant Examiner* — Kim Huynh
(74) *Attorney, Agent, or Firm* — Hanley, Flight & Zimmerman, LLC.

(57) ABSTRACT

A method for efficiently handling interrupts in a virtual technology environment with integrity services is provided. The method comprises assigning an interrupt to a virtual machine that is running a software agent; suspending the software agent; invoking a protected interrupt handler; copying the interrupt's memory content to a protected location, in response to successfully verifying the integrity of the content; replacing the interrupt's return address with a return address for a protected function; switching from the software agent's protected context to its active context; executing the original interrupt handler; returning control to the protected function to ensure that execution of the software agent resumes safely; switching back to the software agent's protected context, in response to successfully verifying the integrity of the content; and passing control back to the software agent to resume execution.

27 Claims, 3 Drawing Sheets

EFFICIENT HANDLING OF INTERRUPTS IN A COMPUTING ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present disclosure relates generally to security in a virtual technology (VT) environment and, more particularly, to a system and method for efficient handling of Interrupts in a VT environment with integrity services.

BACKGROUND

Memory based attacks are a significant threat to computing environments. Some such attacks involve storing malicious code, such as a virus or a worm, in the memory of a computer system, then exploiting bugs or buffer overflows while running legitimate programs to transfer control to the malicious code.

Security, or integrity, services may be implemented to prevent memory based attacks from tampering with a program during execution. The virtual machine (VM) on which the program and operating system are executed, however, may shift control from the program to the operating system, or trigger a VMExit, whenever there is an interrupt, or a request to suspend the program, so that the processor executing the program may respond to another event. A VMExit is expensive in terms of processor (CPU) performance (e.g., costing up to 15,000 CPU cycles), especially in environments where interrupts are frequent (e.g., heavy network traffic may result in hundreds of thousands of interrupts per second).

Systems and methods are needed to provide more efficient interrupt handling in VT environments with integrity services.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

Figure 1:
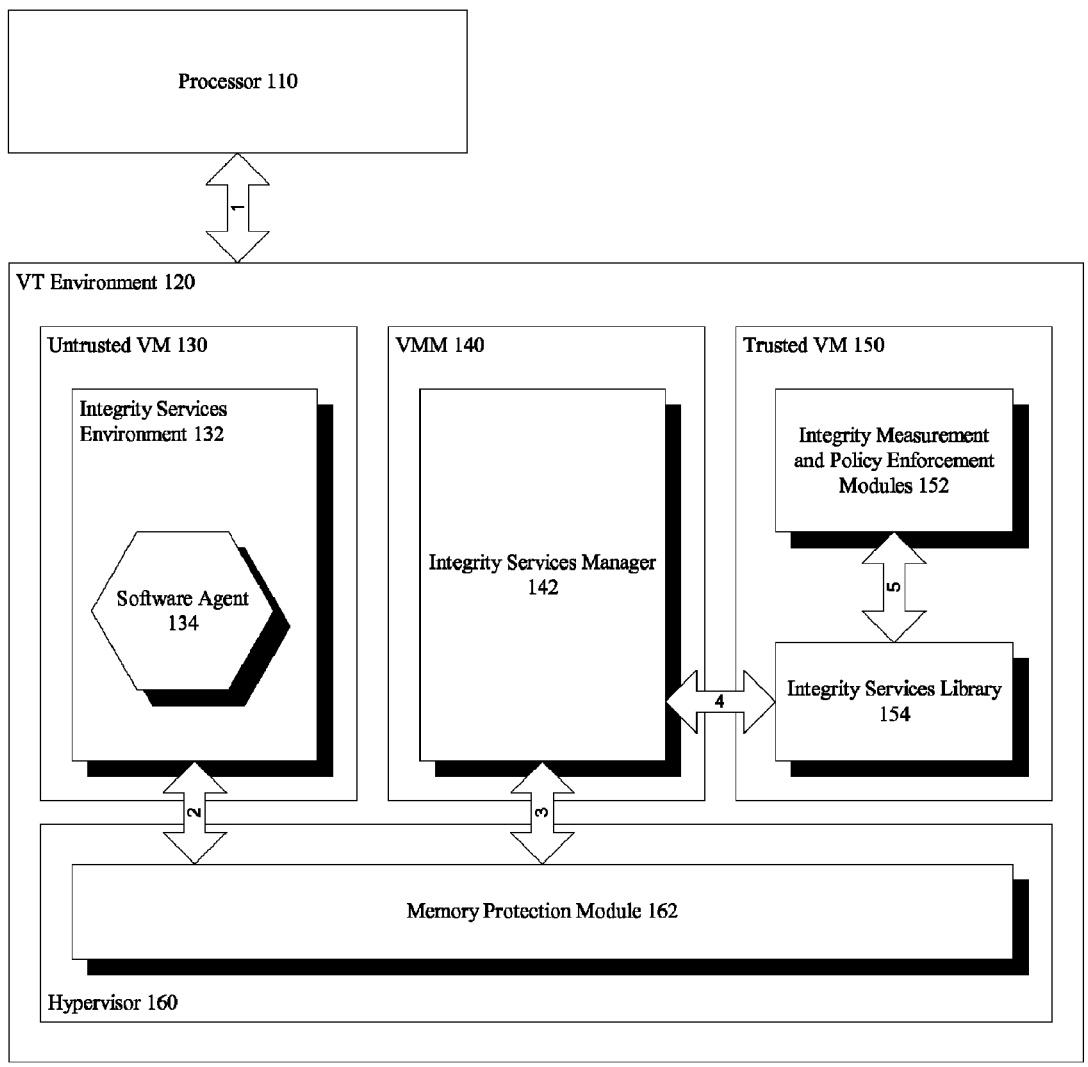
FIG. 1 is a block diagram of an exemplary computing system with a VT environment, in accordance with one embodiment.

The present invention is directed to systems and methods for efficient handling of interrupts in a VT environment with integrity services.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for efficiently handling interrupts in a virtual technology environment with integrity services is provided. The method comprises receiving an interrupt during execution of a software agent; assigning the interrupt to a virtual machine running the software agent; suspending execution of the software agent; invoking a first interrupt handler referred to by a first data structure, wherein the first interrupt handler and the first data structure are enforced as read-only by a memory protection module; copying content to a first memory location from a second memory location allocated to the interrupt, in response to successfully verifying that the content has not been tampered with by malicious code; and replacing a first return address from the first memory location with a second return address. The first and second return addresses refer to first and second functions for returning to execution of the software agent.

The method may further comprise switching from a first mode to a second mode for the software agent, wherein the first mode protects the software agent from memory attacks and the second mode does not; executing a second interrupt handler referred to by a second data structure; returning control to the second function instead of the first function to ensure that execution of the software agent resumes safely; identifying an instruction, wherein the instruction was suspended due to the interrupt; switching to the software agent's first mode, in response to successfully verifying that the content in the first memory location allocated to the interrupt has not been tampered with by malicious code; and passing control back to the identified instruction to resume execution of the software agent.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

In accordance with one embodiment, when a processor receives an interrupt while executing a program, the virtual machine (VM) on which the program and operating system are executed may trigger a segue instruction (e.g., VMExit), thereby slowing processor performance, unless the interrupt is directly assigned to the VM. Direct assignment may expose the program to memory attack because, even though the program may be protected by integrity services, the interrupt handler that manages the interrupt may not be. The example implementation provided below allows secure handling of directly assigned interrupts during execution of a program in a protected mode or context.

Referring to FIG. 1, in accordance with one embodiment, an exemplary computing system may comprise processor(s) 110, virtual technology (VT) environment 120, untrusted virtual machine (VM) 130, VM manager (VMM) 140, trusted VM 150, and hypervisor 160. Untrusted VM 130 may comprise programs and modules (e.g., software agent 134) and corresponding integrity services environments (e.g., integrity services environment 132). VM manager 140 may comprise integrity services manager 142, and trusted VM 150 may comprise integrity measurement and policy enforcement modules 152 and integrity services library 154. Hypervisor 160 may comprise memory protection module 162.

Processor 110 may communicate with VT environment 120 by way of connection 1. Integrity services environment 132 may communicate with memory protection module 162 by way of connection 2, and integrity services manager 142 may communicate with memory protection module 162 by way of connection 3. Integrity services manager 142 and integrity measurement and policy enforcement modules 152 may communicate with integrity services library 153 by way of connections 4 and 5, respectively.

In one embodiment, VM 140 may comprise an operating system with an interrupt descriptor table (IDT) (not shown), and processor 110 may comprise a first pointer (e.g., control register 3 or CR3) (not shown) and a second pointer (e.g. interrupt descriptor table register or IDTR) (not shown). The IDT may refer to interrupt handlers, for example. The first pointer (e.g., CR3) may define the context in which processor 110's current task is executed by referring to the page table for the task, for example. The second pointer (e.g., IDTR) may refer to the IDT that processor 110 uses to execute interrupt handlers, for example.

In alternative embodiments, the IDT, page tables, and first and second pointers may be implemented with other data structures. For example, depending on implementation, other data structures such as linked lists, vectors, arrays, tables, pointers, or other suitable data structures may be utilized.

In one embodiment, integrity measurement and policy enforcement modules 152 corresponding to software agent 134 may verify the integrity of software agent 134's executable image and static data when software agent 134 is loaded into VM 130's memory. Upon successful verification, integrity services manager 142 may register software agent 134 with memory protection module 162 by moving software agent 134's executable code to a protected memory location associated with a protected page table and a protected IDT so that software agent 134 is protected during execution.

In one embodiment, upon registration, memory protection module 162 may notify integrity measurement and policy enforcement modules 152. It is noteworthy that the term "protected" or "protected context" refers to a mode in which software agent 134 is protected from tampering by memory attacks, and the term "active" refers to a mode in which software agent 134 is unprotected from such attacks.

Figure 2:
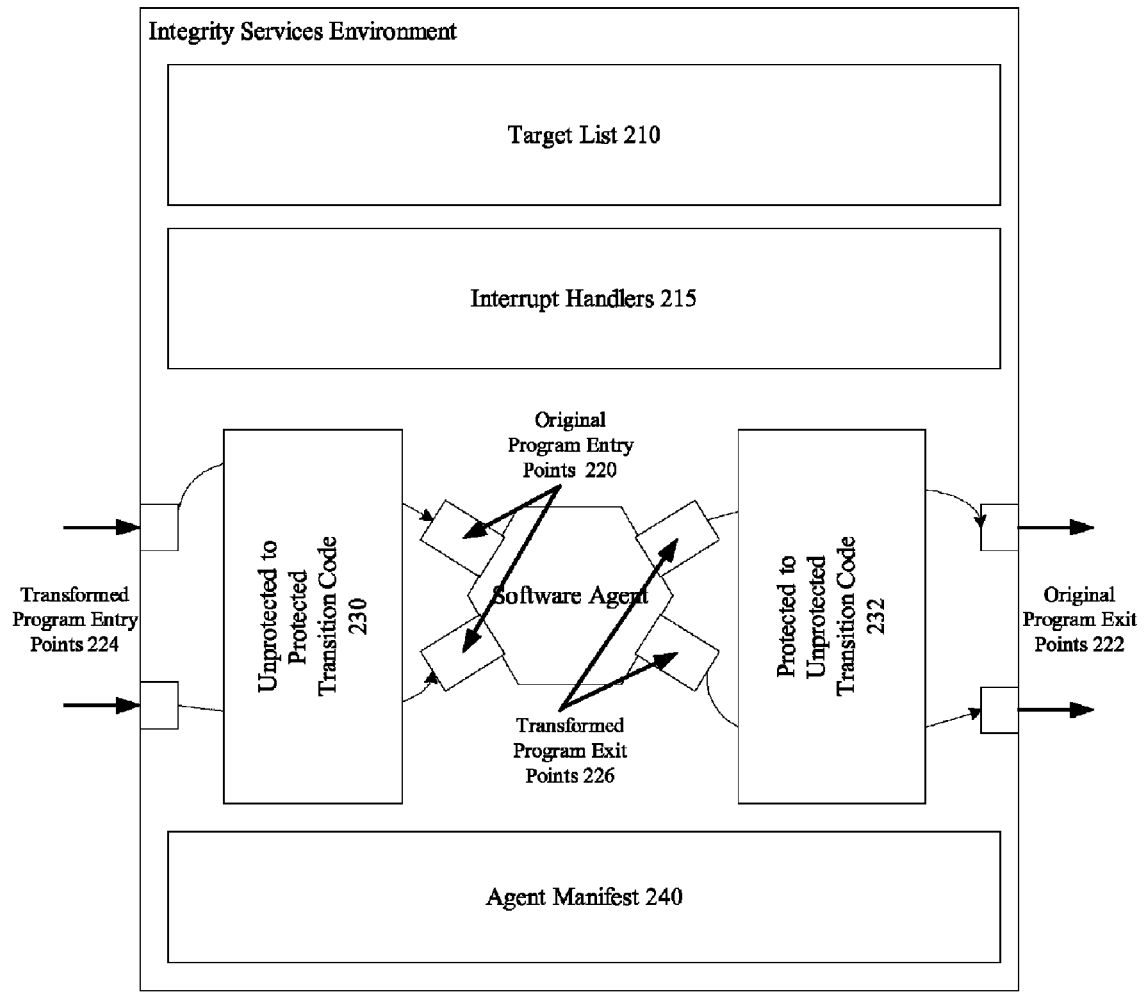
FIG. 2 illustrates an exemplary integrity services environment, in accordance with one embodiment.

Integrity services environment 132 may act as an interface between the unprotected environment of VM 140's operating system and software agent 134's executable file. Referring to FIGS. 1 and 2, in accordance with one embodiment, integrity services environment 132 may comprise software agent 134, target list 210, interrupt handlers 215, original program entry points 220, transformed program entry points 224, original program exit points 222, transformed program exit points 226, unprotected to protected transition codes 230, protected to unprotected transition codes 232, and agent manifest 240.

Target list 210 may comprise a memory page shared by integrity services environment 132 and memory protection module 162 that provides mappings between software agent 134's active page table and software agent 134's protected page table, for example. The memory page may be enforced by memory protection module 162 to be read-only from any software outside VMM 140. To switch software agent 134 into a protected mode, hypervisor 160 may load the location of software agent 134's protected page table into a pointer or register (e.g., a CR3 register) in processor 110. To switch software agent 134 out of the protected context, hypervisor 162 may load the location of software agent 134's active page table into a pointer or register (e.g., CR3) in processor 110.

Still referring to FIGS. 1 and 2, in accordance with one embodiment, original program entry points 220 and original program exit points 222 for software agent 134 may be detected by transition code 230 and transition code 232, respectively. Upon detecting original program entry points 220 and original program exit points 222, transition code 230 and transition code 232 may generate transformed program entry points 224 and transformed program exit points 226 to control entry to and exit from software agent 134's protected context.

In one embodiment, when processor 110 invokes a transformed program entry point 224, if a valid protected page table is registered in target list 210, hypervisor 160 may switch software agent 134 to the protected context associated with the protected page table. Hypervisor 160 may also load the location of software agent 134's protected IDT that is loaded into a pointer or register (e.g., IDTR register) in processor 110. If a valid protected page table is not registered in target list 210, processor 110 may request hypervisor 160 to create and register a new protected page table for software agent 134 before switching to the protected context. In the protected context, transformed program entry point 224 may invoke corresponding original program entry point 220.

When processor 110 invokes a transformed program exit point 226, hypervisor 160 may switch software agent 134 back to the active context associated with the active page table. Hypervisor 160 may also load the location of VM 140's operating system's active IDT into processor 110's register (e.g., IDTR). Once software agent 134 has switched out of the protected context, transformed program exit point 226 may invoke corresponding original program exit point 222.

Transformed program entry points 224 protect software agent 134 from being tampered with by memory attacks by ensuring that software agent 134's executable code is executed in a protected context. In the protected context, an active or unprotected interrupt handler may not access software agent 134's memory or an interrupt's memory. For instance, a protected page table restricts access to software agent 134's memory, and a protected IDT along with protected interrupt handlers restricts access to an interrupt's memory.

Figure 3:
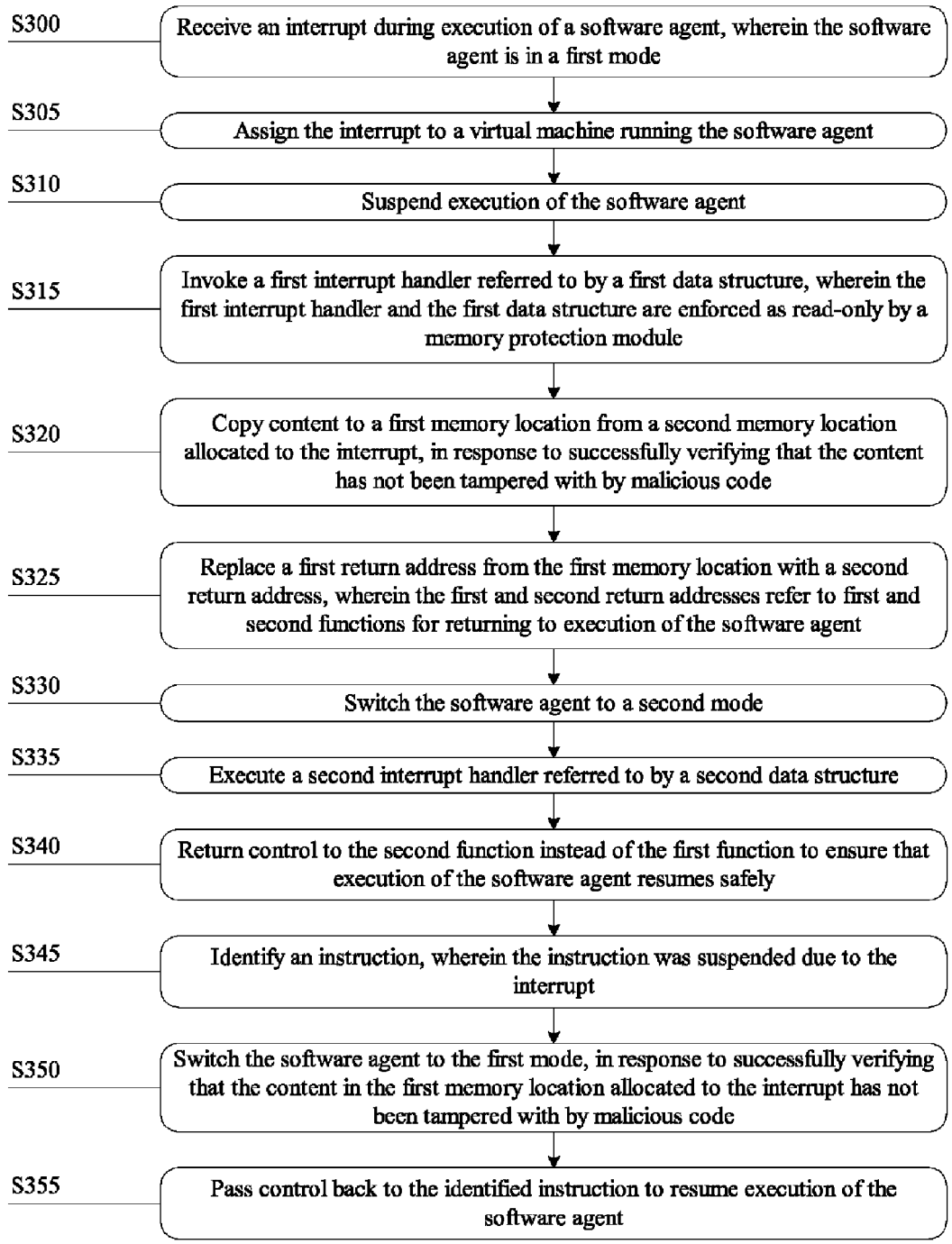
FIG. 3 is a flow diagram of an exemplary method for handling interrupts, in accordance with one embodiment.

Referring to FIG. 3, in accordance with one embodiment, when an interrupt is received during execution of software agent 134 (S300), the interrupt may be assigned to VM 130, which is running software agent 134 (S305). To handle the interrupt, processor 110 may suspend execution of software agent 134 (S310) and invoke protected interrupt handler 215, referred to by software agent 134's protected IDT, wherein protected interrupt handler 215 and the protected IDT are enforced as read-only by memory protection module 162 (S315). Once integrity measurement and policy enforcement modules 152 successfully verify the integrity of the interrupt's active stack, or memory, the memory contents may be copied to a protected interrupt stack (S320). The return address on the protected interrupt stack may be replaced with a return address for a protected return function (S325). Hypervisor 160 may then switch from software agent 134's protected context to software agent 134's active context (S330).

In the active context, processor 110 may invoke the corresponding active interrupt handler referred to by VM 140's operating system's active IDT (S335). When the active interrupt handler finishes executing, control may be returned to the protected return function to ensure that execution of software agent 134 resumes safely (S340). Once the protected return function identifies the instruction that was suspended due to the interrupt (S345), hypervisor 160 may switch software agent 134 back to the protected context (S350), and control may be passed back to the identified instruction to resume execution of software agent 134 (S355).

It should be understood that the logic code, programs, modules, processes, methods, and the order in which the respective elements of each method are performed are purely exemplary. Depending on implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips may be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product may be any product that includes integrated circuit chips, ranging from toys and other low-end applications to advanced computer products having a display, a keyboard or other input device, and a central processor.

Therefore, it should be understood that the invention may be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for handling interrupts in a virtual technology environment with integrity services, the method comprising:
    receiving an interrupt during execution of a software agent, wherein the software agent is in a first mode;
    assigning the interrupt to a virtual machine running the software agent;
    suspending execution of the software agent;
    invoking a first interrupt handler referred to by a first data structure, wherein the first interrupt handler and the first data structure are enforced as read-only by a memory protection module;
    copying content to a protected interrupt stack from an active interrupt stack allocated to the interrupt in response to verifying that the content has not been tampered with by malicious code;
    replacing a first return address from the protected interrupt stack with a second return address, wherein the first and second return addresses refer to first and second functions for returning to execution of the software agent;
    switching the software agent to a second mode;
    executing a second interrupt handler referred to by a second data structure;
    returning control to the second function instead of the first function to ensure that execution of the software agent resumes safely;
    identifying an instruction, wherein the instruction was suspended due to the interrupt;
    switching the software agent to the first mode in response to verifying that the content in the protected interrupt stack allocated to the interrupt has not been tampered with by malicious code; and
    passing control back to the identified instruction to resume execution of the software agent.

2. The method of claim 1, wherein the first mode protects the software agent from memory attacks.

3. The method of claim 1, wherein the second mode fails to protect the software agent from memory attacks.

4. The method of claim 1, wherein the first interrupt handler, the first data structure, and the protected interrupt stack are associated with the first mode.

5. The method of claim 1, wherein the second interrupt handler, the second data structure, and the active interrupt stack are associated with the second mode.

6. The method of claim 1, wherein the first data structure is created in response to the software agent being registered with the memory protection module.

7. The method of claim 1, wherein switching the software agent to the first mode comprises:
    loading a first pointer with a location of a memory location, wherein the memory location refers to a page table that belongs to the first mode; and
    loading a second pointer with the location of the first data structure.

8. The method of claim 7, wherein a third data structure maps locations for page tables belonging to the first mode to locations for page tables belonging to the second mode.

9. The method of claim 1, wherein switching the software agent to the second mode comprises:
    loading a first pointer with a location of a memory location, wherein the memory location refers to a page table that belongs to the second mode; and
    loading a second pointer with the location of the second data structure.

10. A system comprising:
    a memory storing machine readable instructions; and
    a processor to execute the instructions to:
    receive an interrupt during execution of a software agent, wherein the software agent is in a first mode;
    assign the interrupt to a virtual machine running the software agent;
    suspend execution of the software agent;
    invoke a first interrupt handler referred to by a first data structure, wherein the first interrupt handler and the first data structure are enforced as read-only by a memory protection module;

copy content to a protected interrupt stack from an active interrupt stack allocated to the interrupt in response to verifying that the content has not been tampered with by malicious code;

replace a first return address from the protected interrupt stack with a second return address, wherein the first and second return addresses refer to first and second functions for returning to execution of the software agent;

switch the software agent to a second mode;

execute a second interrupt handler referred to by a second data structure;

return control to the second function instead of the first function to ensure that execution of the software agent resumes safely;

identify an instruction, wherein the instruction was suspended due to the interrupt;

switch the software agent to the first mode, in response to verifying that the content in the protected interrupt stack allocated to the interrupt has not been tampered with by malicious code; and pass control back to the identified instruction to resume execution of the software agent.

11. The system of claim 10, wherein the first mode is to protect the software agent from memory attacks.

12. The system of claim 10, wherein the second mode fails to protect the software agent from memory attacks.

13. The system of claim 10, wherein the first interrupt handler, the first data structure, and the protected interrupt stack are to be associated with the first mode.

14. The system of claim 10, wherein the second interrupt handler, the second data structure, and the active interrupt stack are to be associated with the second mode.

15. The system of claim 10, wherein the first data structure is to be created in response to the software agent being registered with the memory protection module.

16. The system of claim 10, wherein the instructions, when executed, cause the processor to:
load a first pointer with a location of a memory location, wherein the memory location is to refer to a page table that belongs to the first mode; and
load a second pointer with the location of the first data structure, wherein a third data structure is to map locations for page tables belonging to the first mode to locations for page tables belonging to the second mode.

17. The system of claim 10, wherein the instructions, when executed, cause the processor to:
load a first pointer with a location of a memory location, wherein the memory location refers to a page table that belongs to the second mode; and
load a second pointer with the location of the second data structure.

18. A tangible machine readable storage medium comprising instructions that, when executed by a processor, cause a machine to, at least:
receive an interrupt during execution of a software agent, wherein the software agent is in a first mode;
assign the interrupt to a virtual machine running the software agent;
suspend execution of the software agent;
invoke a first interrupt handler referred to by a first data structure, wherein the first interrupt handler and the first data structure are enforced as read-only by a memory protection module;
copy content to a protected interrupt stack from an active interrupt stack allocated to the interrupt in response to verifying that the content has not been tampered with by malicious code;
replace a first return address from the protected interrupt stack with a second return address, wherein the first and second return addresses refer to first and second functions for returning to execution of the software agent;
switch the software agent to a second mode;
execute a second interrupt handler referred to by a second data structure;
return control to the second function instead of the first function to ensure that execution of the software agent resumes safely;
identify an instruction, wherein the instruction was suspended due to the interrupt;
switch the software agent to the first mode, in response to verifying that the content in the protected interrupt stack allocated to the interrupt has not been tampered with by malicious code; and
pass control back to the identified instruction to resume execution of the software agent.

19. The machine readable storage medium of claim 18, wherein the instructions, when executed, cause the machine to protect, with the first mode, the software agent from memory attacks.

20. The machine readable storage medium of claim 18, wherein the instructions, when executed, cause the machine to fail to protect, with the second mode, the software agent from memory attacks.

21. The machine readable storage medium of claim 18, wherein the instructions, when executed, cause the machine to associate the first interrupt handler, the first data structure, and the protected interrupt stack with the first mode.

22. The machine readable storage medium of claim 18, wherein the instructions, when executed, cause the machine to associate the second interrupt handler, the second data structure, and the active interrupt stack with the second mode.

23. The machine readable storage medium of claim 18, wherein the instructions, when executed, cause the machine to create the first data structure in response to the software agent being registered with the memory protection module.

24. The machine readable storage medium of claim 18, wherein the instructions, when executed, cause the machine to:
load a first pointer with a location of a memory location, wherein the memory location refers to a page table that belongs to the first mode; and
load a second pointer with the location of the first data structure, wherein a third data structure maps locations for page tables belonging to the first mode to locations for page tables belonging to the second mode.

25. The machine readable storage medium of claim 18, wherein the instructions, when executed, cause the machine to:
load a first pointer with a location of a memory location, wherein the memory location refers to a page table that belongs to the second mode; and
load a second pointer with the location of the second data structure.

26. A method as described in claim 1, wherein the content comprises at least one of an executable image associated with the software agent or static data associated with the software agent.

27. A system as described in claim 10, wherein the content comprises at least one of an executable image associated with the software agent or static data associated with the software agent.

* * * * *